United States Patent [19]

Suzuki et al.

[11] Patent Number: 4,819,382
[45] Date of Patent: Apr. 11, 1989

[54] WEATHER STRIP FOR AUTOMOBILE

[75] Inventors: Satoshi Suzuki, Kakegawa; Kiyoshi Shigeki, Fukuroi, both of Japan

[73] Assignee: Toyoda Gosei Co., Ltd., Nishikasugai, Japan

[21] Appl. No.: 143,122

[22] Filed: Jan. 12, 1988

[30] Foreign Application Priority Data

Apr. 3, 1987 [JP] Japan .................. 62-050880

[51] Int. Cl.$^4$ .................. E06B 7/16
[52] U.S. Cl. .................. 49/497; 49/498
[58] Field of Search .................. 49/497, 498

[56] References Cited

U.S. PATENT DOCUMENTS

| 2,942,308 | 6/1960 | Naeser et al. | 49/497 |
| 3,167,821 | 2/1965 | Clark et al. | 49/497 X |
| 4,531,326 | 7/1985 | Ballocca et al. | 49/497 |
| 4,617,220 | 10/1986 | Ginster | 49/498 X |
| 4,619,077 | 10/1986 | Azzola et al. | 49/497 |

Primary Examiner—Philip C. Kannan
Attorney, Agent, or Firm—Cushman, Darby & Cushman

[57] ABSTRACT

A weather strip has a base portion to be mounted along an opening of a window of an automobile body and a seal portion projecting from the base portion to be come in contact with a window glass. The seal portion is composed of a pair of dogleg-shaped portions defining a hollow poriton of a nearly lozenge-shaped section, and a lip portion extending from a top of the hollow seal portion in a direction along an upper half portion of one of the pair of dogleg-shaped portions. The lip portion is pressed by the window glass when the window glass is closed. The thickness (T1) of the lip portion, the thickness (T2) of one of the pair of dogleg-shaped portions, and the thickness (T3) of another one of the pair of dogleg-shaped portions have a relation expressed by the following inequality: T1 > T2 > T3. And the lip portion extends in a direction approximate to a vertical direction as compared with the extending direction of the upper half portion of the one of the pair of dogleg-shaped portions. By providing a difference in thickness between the dogleg-shaped portions and the lip portion, an undesirable increase of the pressing load can be prevented, and accordingly, the seal force of the weather strip can be made uniform regardless of the change of the fitting condition of the window glass to the opening of the window.

3 Claims, 3 Drawing Sheets

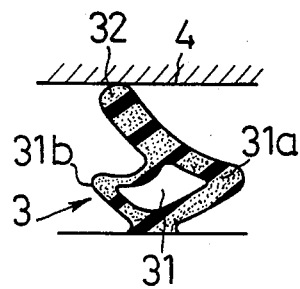
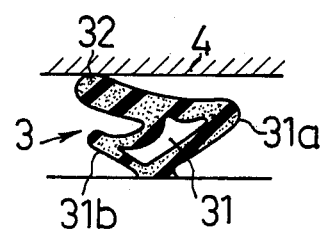
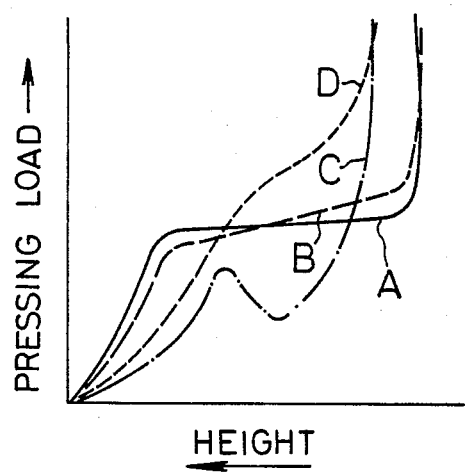

WEATHER STRIP FOR AUTOMOBILE

BACKGROUND OF THE INVENTION

1. Field of the Invention

The present invention relates to a weather strip to be mounted on a window of an automobile.

2. Description of the Prior Art

In an automobile shown in FIG. 1, a weather strip is mounted along an opening edge of a quarter window 1, and a peripheral edge of a hinged window glass is pressed against the weather strip of the quarter window 1.

FIG. 5 illustrates the conventional weather strip W to be mounted along an opening of the quarter window 1. The weather strip W is provided with a base portion 2 of a letter U-shaped cross-section and a seal portion 3 of a dogleg-shaped cross-section, which projects from the base portion 2. The weather strip W having the above-described structure is mounted on a flange 4 formed along an opening of the quarter window by forcibly inserting the flange 4 between retaining lips 21 of the base portion 2. The upper half of the dogleg-shaped seal portion 3 is made of sponge rubber. When the quarter window 1 is closed, the window glass 5 is pressed against the upper portion of the seal portion 3.

The fitting condition of the window glass to the quarter window is inevitably lacking in positional uniformity, and accordingly, the position (height) of the closed window glass is also lacking in positional uniformity.

In FIG. 4, the line C shows the relation between the height of the closed window glass and the pressing load of the window glass to the weather strip in the case of the conventional weather strip shown in FIG. 5.

When the window glass 5 is pressed to the dogleg-shaped portion 3, the pressing load is rapidly increased. As the window glass 5 is pressed further against the seal portion 3, namely the position of the glass surface of the closed window glass 5 is lowered, the seal portion 3 is bent at its curved point so that the pressing load is temporally decreased. And, as the weather strip is more pressed, the pressing load is increased again so that the seal portion 3 is bottomed on the side surface of the base portion 2.

FIG. 6 illustrates another conventional weather strip. The seal portion 3 is composed of a pair of dogleg-shaped portions 31a and 31b, which define a hollow portion 31 of a nearly lozenge-shaped cross-section, and a lip portion 32 extending from the top of the hollow portion 31 along a production of the upper half portion of the dogleg-shaped portion 31a.

In FIG. 4, the line D shows the change of the pressing load in this other conventional weather strip. In this weather strip, both dogleg-shaped portions 31a and 31b are bent simultaneously while being supported by each other. Therefore, the pressing load is greatly increased as the position of the window glass is lowered when the window glass is closed. In this weather strip, the temporary decrease of the pressing load which is encountered in the conventional weather strip shown in FIG. 5 (which is described above in relation to line C of FIG. 4) is not observed.

As described above, in the conventional weather strip, pressing load is greatly changed with the height of the window glass in the closing state.

Therefore, the conventional weather strip has a problem that when the closed position of the window glass is high, the seal force thereof becomes too small, and when the closed position of the window glass is low, the closing force thereof becomes too large.

In order to overcome this problem, it has been demanded to provide a weather strip to which a uniform pressing load is applied regardless of the change of the height of the closed window glass.

SUMMARY OF THE INVENTION

It is an object of the present invention to provide a weather strip to which a uniform pressing load is applied, and which exhibits a uniform seal force regardless of positional non-uniformity in the height of the closed window glass.

The weather strip according to the present invention has a base portion to be mounted along an opening of a window of an automobile body and a seal portion projecting from the base portion to come in contact with a window glass. The seal portion is composed of a pair of dogleg-shaped portions defining a hollow portion of a nearly lozenge-shaped cross-section, and a lip portion extending from the top of the hollow seal portion in a direction along an upper half portion of one of the pair of dogleg-shaped portions. The lip portion is pressed by the window glass when the window glass is closed.

The thickness($T1$) of the lip portion, the thickness($T2$) of the one of the pair of dogleg-shaped portions, and the thickness($T3$) of another one of the pair of dogleg-shaped portions have a relation expressed by the following inequality: $T1 > T2 > T3$. And the lip portion extends in a direction approximate to a vertical direction as compared with the extending direction of the upper half portion of the one of the pair of dogleg-shaped portions.

According to the present invention, by providing difference in thickness between the dogleg-shaped portions, and the lip portion, the increase of the pressing load as observed in the conventional weather strip can be prevented.

In particular, by setting the thicknesses $T1$, $T2$ and $T3$ so as to satisfy the relation $T2:T1 = 1:1.1 \sim 1.5$, $T2:T3 = 1:0.6 \sim 0.9$, the pressing load of the window glass to the weather strip can be maintained uniform in a wide range of the height of the closed window glass and accordingly, the sealing force can be made uniform regardless of the closed position of the window glass.

BRIEF EXPLANATION OF THE DRAWINGS

FIGS. 2 and 3(A) and 3(B) illustrate an embodiment of a weather strip according to the present invention;

FIG. 2 is a transverse cross-sectional view of the weather strip, taken along the line of II—II of FIG. 1;

FIGS. 3(A) and 3(B) are transverse cross-sectional views illustrating the deformation of a seal lip of the weather strip when pressed by a window glass;

FIG. 4 is a graph showing the relation between the height of the closed window glass and the pressing load to the weather strip according to the present invention and the conventional weather strip.

DETAILED DESCRIPTION OF THE PREFERRED EMBODIMENT

Hereinafter, the present invention will be explained in detail in accordance with the embodiment shown in FIGS. 2, 3(A) and 3(B), and the graph shown in FIG. 4.

Figure 1:
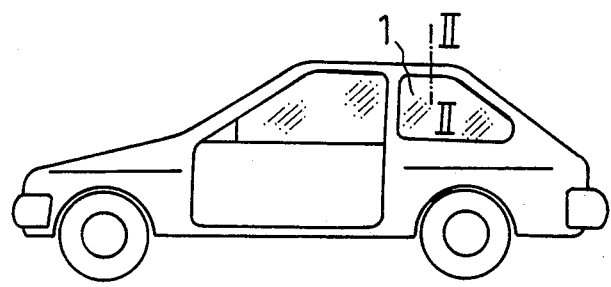
FIG. 1 is a side elevational view of an automobile.
Figure 2:
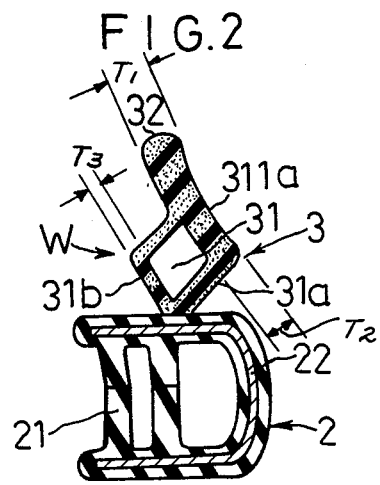
Figure 5:
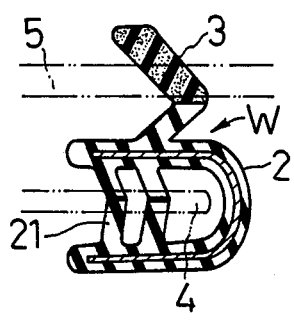
FIGS. 5 and 6 are transverse cross-sectional views of the conventional weather strips.

As shown in FIG. 2, the weather strip W is composed of a base portion 2 of a letter U-shaped cross-section, which is made of solid rubber, and a seal portion 3 made of sponge rubber, which projects from the side surface of the base portion 2. The weather strip W having the above-described structure is produced by extruding.

In the base portion 2 is embedded a core member 22. And lips 21 project from the opposed inner surfaces of the base portion 2 for retaining a flange of an automobile body. The seal portion 3 is composed of a pair of dogleg-shaped portions 31a, 31b, which defines a hollow portion 31 of a nearly lozenge-shaped cross-section, and a lip portion 32 extending from the top of the hollow portion 31 in a direction approximating a vertical direction as compared with the extending direction of the upper half portion 311a of the dogleg-shaped portion 31a. The thickness(T1) of the lip portion 32, the thickness(T2) of the dogleg-shaped portion 31a and the thickness(T3) of the dogleg-shaped portion 31b are set so as to satisfy the following relation:

$$T1 > T2 > T3$$

$$T2:T1 = 1:1.1 \sim 1.5 \text{ (preferably } 1.2 \sim 1.5)$$

$$T2:T3 = 1:0.6 \sim 0.9 \text{ (preferably } 0.7 \sim 0.8)$$

The relation between the pressing load and the height of the closed window glass pressing the seal portion 31 of the weather strip according to the present invention is shown by the line B of FIG. 4.

When a window glass 4 is pressed to the lip portion 32, at first, the pressing load is rapidly increased, since the lip portion 32 is thick, extends in a direction nearly perpendicular to the glass surface, and is supported by a pair of dogleg-shaped portions 31a and 31b.

When the window glass 4 further presses the weather strip 3, namely, the position of the glass surface is lowered, the thinner dogleg-shaped portion 31b is bent at its curved point as shown in FIG. 3(A).

When the window glass 4 further presses the weather strip 3, namely, the position of the glass surface is more lowered, the dogleg-shaped portion 31a is also bent, and accordingly, the lip portion 32 is inclined as shown in FIG. 3(B). Then, the dogleg-shaped portion 31a is further bent and the hollow portion 31 is completely crushed.

Figure 6:
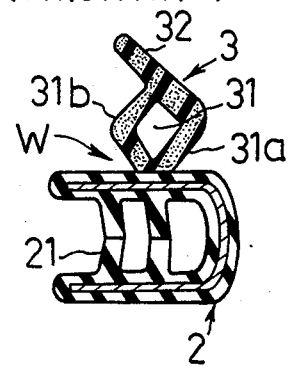

According to the present invention, the pressing load is not so remarkably increased until the seal portion 3 is bottomed on the side surface of the base portion 2 after the dogleg-shaped portion 31b is bent as shown in FIG. 3(A). Namely, by providing difference in thickness between the dogleg-shaped portions 31a and 31b, they are not supported by each other and the dogleg-shaped portion 31a leans on the dogleg-shaped portion 31b. Therefore, the increase of the pressing load as observed in the conventional weather strip shown by the lines C and D in FIG. 6, can be prevented.

As described above, according to the present invention, the pressing load can be maintained uniform in a wide range similar to the ideal line A of FIG. 4. Consequently, a nearly uniform seal force can be obtained regardless of the change of the height of the closed window glass due to positional non-uniformity in the fitting condition thereof.

What is claimed is:

1. A weather strip for an automobile, comprising:
   a base portion to be mounted along an opening of a window of an automobile body;
   a seal portion projecting from said base portion to come in contact with a window glass;
   said seal portion being composed of a pair of dogleg-shaped portions each having an upper half portion above a respective bend and a lower portion below the respective bend, said dogleg-shaped portions defining a hollow portion having a nearly lozenge-shaped section and a top, and a lip portion extending upwards from the top of said hollow seal portion as an approximately coplanar extension in an extending direction, of the upper half portion of one of said pair of dogleg-shaped portions, said lip portion being positioned to be pressed by said window glass when said window glass is closed;
   the thickness(T1) of said lip portion, the thickness(T2) of said one of said pair of dogleg-shaped portions, and the thickness(T3) of the other of said dogleg-shaped portions having a relation expressed by the following inequality: $T1 > T2 > T3$; and
   said lip portion extending in a direction which is more nearly vertical as compared with said extending direction of said upper half portion of said one of said pair of dogleg-shaped portions.

2. A weather strip according to claim 1, wherein said base portion is made of solid rubber and has a U-shaped section with two opposite sides having respective outer surfaces, and said seal portion is made of sponge rubber and projects from the outer surface of one of said sides of said base portion.

3. A weather strip according to claim 2, wherein T1, T2 and T3 are related to one another in accordance with the following equations:

$$T2:T1 = 1:1.1 \sim 1.5$$

$$T2:T3 = 1:0.6 \sim 0.9.$$

* * * * *